Patented Apr. 28, 1942

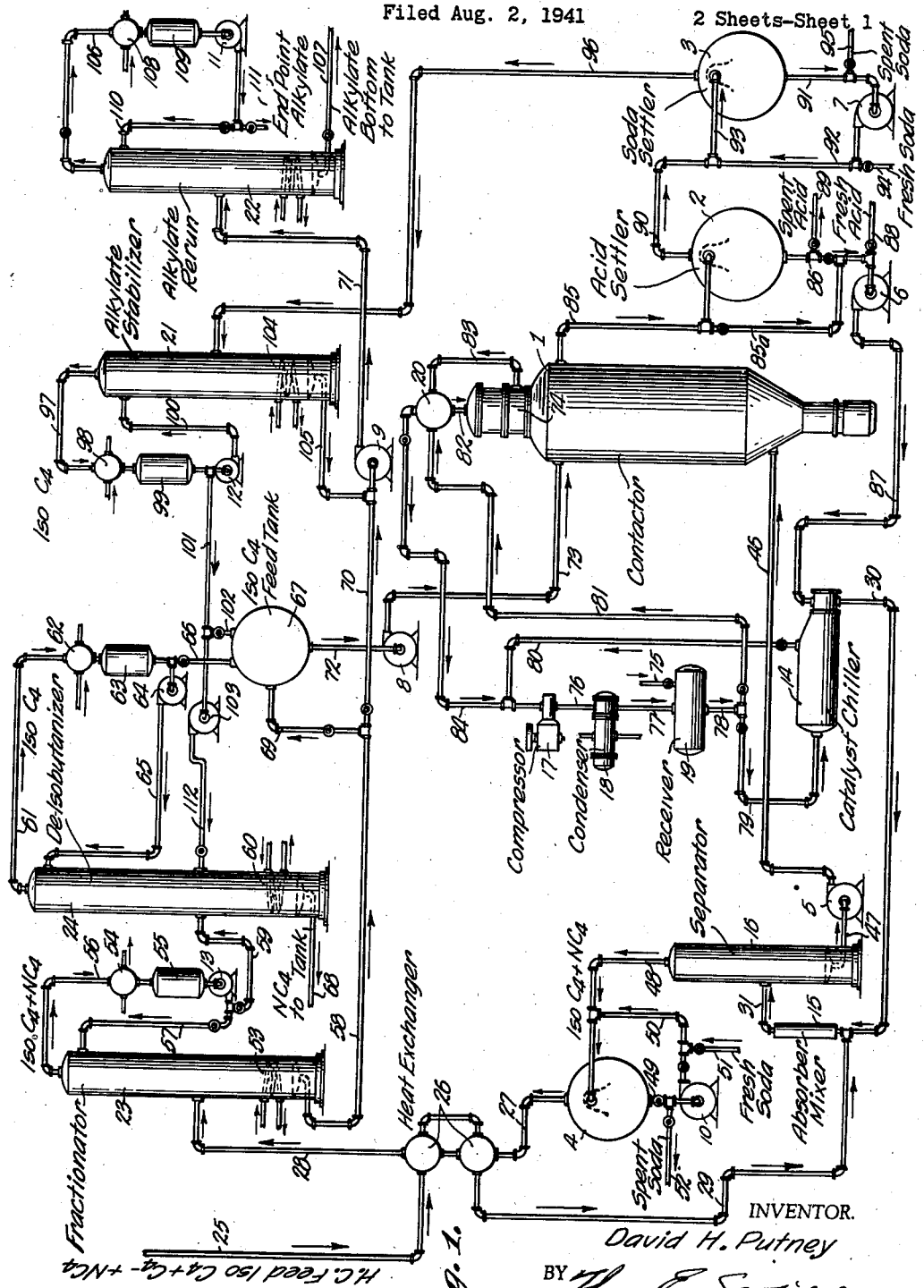

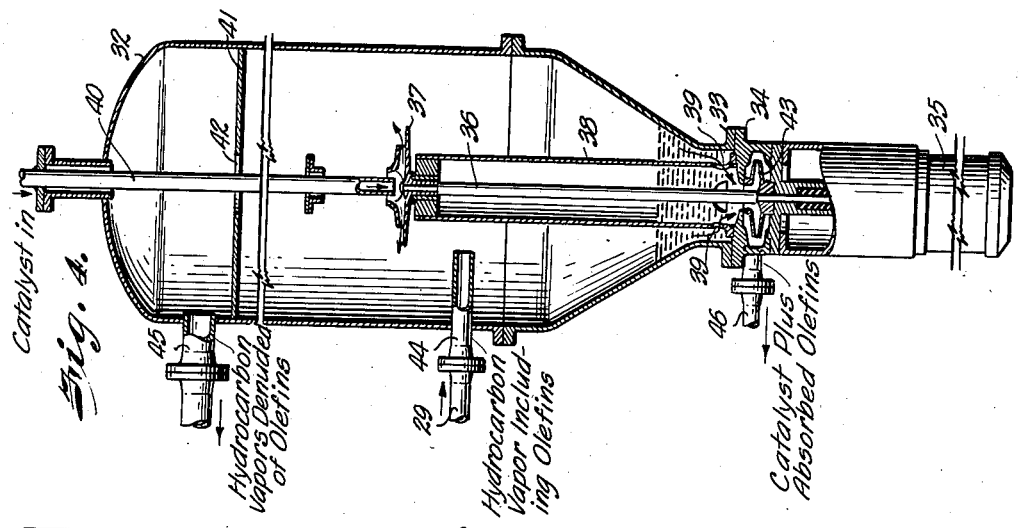
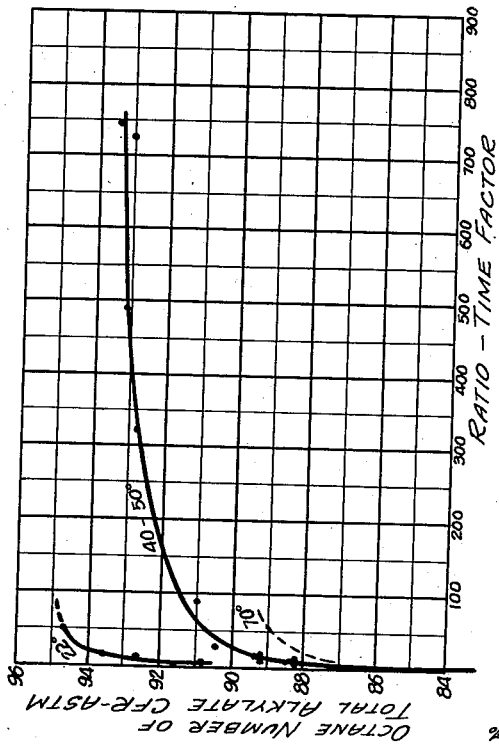
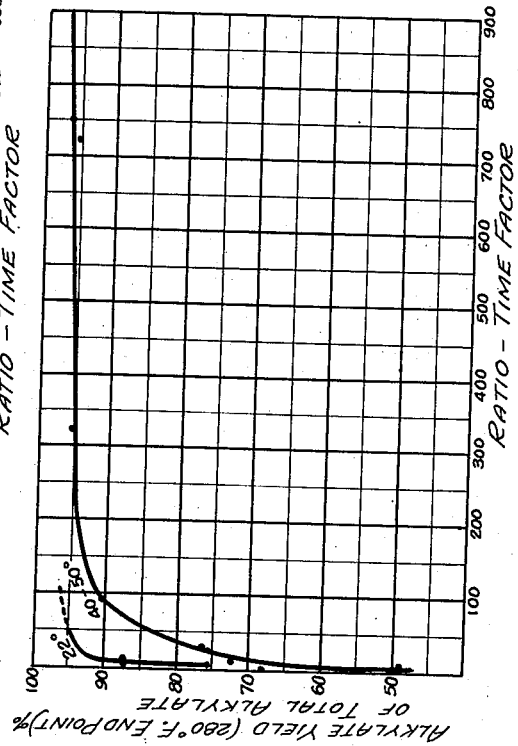

2,281,248

UNITED STATES PATENT OFFICE 2,281,248

PROCESS OF ALKYLATING HYDROCARBONS

David H. Putney, Kansas City, Mo., assignor to Stratford Development Corporation, Kansas City, Mo., a corporation of Delaware Application August 2, 1941, Serial No. 405,199

5 Claims. (Cl. 196—10)

This invention relates to a process of alkylating hydrocarbons in which iso-paraffinic hydrocarbons are alkylated with olefinic hydrocarbons in the presence of a condensation catalyst, and relates more particularly to a modified process for alkylation in which the olefinic hydrocarbons are separated from the diluents by preliminary absorption in the condensation catalyst before charging to the alkylation reaction zone.

Iso-paraffinic hydrocarbons, such as iso-butane, iso-pentane and the like have been alkylated with olefinic hydrocarbons in the presence of catalysts such as sulfuric acid and phosphoric acid. Iso-butane has been reacted with butylene to produce iso-octane. The reaction takes place in the presence of a condensation catalyst and is exothermic.

Throughout this specification, the term "alkylate" is used to indicate a fraction of the total condensation product which is suited for blending to produce premium aviation or motor fuel, and the term "total alkylate" constitutes all condensation products removed from the alkylation stage. "Acid-olefin ratio," as used herein, means the volumetric relationship which the acid catalyst bears to the absorbed olefin. "Time factor" as used herein, is the residence time that the olefin remains in the acid catalyst from the time of absorption to its introduction into the alkylation stage.

In an alkylation system such as described in application Serial No. 376,584, filed January 30, 1941, wherein the olefinic hydrocarbons are first absorbed in the recycled acid settled from the effluent from the alkylation stage prior to recharging the mixture of acid catalyst and olefinic hydrocarbons to the alkylation contactor, it has been discovered that a definite relationship exists between the quality of the alkylate produced, the acid-olefin ratio and the residence time of the olefin in the acid before reaching the alkylation reaction zone.

It is believed that investigators have failed to achieve good results when charging olefins absorbed in acid to alkylation plants for the reason that they have failed to realize the importance of the relation which exists between acid-olefin ratio and the residence time factor of the olefin in the acid as controlling operating variables.

An advantage of the present method is the absorption of the olefinic hydrocarbons in the catalyst, thereby making possible the elimination of diluent and inert materials from the charge, such as normal butane.

A further advantage of the process lies in the elimination or substantial reduction of expensive apparatus to separate out inert material combined with alkylate, on its discharge from the reaction stage and prior to its fractionation or conversion to a final product.

Another advantage of the process is its ability to utilize for absorbing the olefin, acid recycled directly from the alkylation zone without dilution or fortification.

Still another advantage of the process is the production of a better quality total alkylate as compared to other methods utilizing preliminary olefin absorption in the catalyst.

In the accompanying drawings which form part of the instant specification and are to be read in conjunction therewith, and in which like reference numerals are used to indicate like parts in the various views;

Fig. 1 is a flow diagram of the process, showing the apparatus in diagrammatic form.

Fig. 2 is a chart in which there has been plotted octane number against the acid-olefin ratio divided by the time factor.

Fig. 3 is a chart showing alkylate yield (280° F. end point) in per cent of total alkylate plotted against the acid-olefin ratio, divided by the time factor.

Fig. 4 is a modified type of absorber-separator.

Referring to the drawings; at 1 is shown a contactor, the structural details of which are disclosed in a prior application, filed in the name of David H. Putney, Serial No. 370,609, on December 18, 1940. Numerals 2, 3, and 4 designate settlers; numerals 5, 6, 7, 8, 9, 10, 11, 12, 13, 64, and 103, pumps.

That portion of the apparatus comprising the absorption step includes a chiller 14, a mixer 15, and a separator 16.

The refrigeration system used for extracting heat and for pre-cooling the catalyst prior to absorption of the olefin comprises a compressor 17, a condenser 18 and a receiver 19. A separator 20, located above the contactor 1 serves as a collecting reservoir for the refrigerant prior to its introduction to the heat exchanger, positioned in the top of the contactor, and permits separation of the gaseous material from the liquid refrigerant which is discharged from the heat exchanger. Fractionation equipment for removing unreacted iso-paraffins from the alkylate, equipment for stabilizing and rerunning the alkylate include the alkylate stabilizer 21 and rerun tower 22.

Equipment for separating small amounts of alkylate and polymerized olefins which may be carried with the iso-butane and normal butane recovered from the absorption system include a fractionator 23 and a de-isobutanizer 24.

Describing the operation, the feed stock preferably includes unsaturated hydrocarbons which comprise normally gaseous materials resulting from the cracking of hydrocarbons or hydrocarbon gases, the destructive hydrogenation of hydrocarbons or dehydrogenation of hydrocarbons and iso-paraffins having a boiling range below gasoline, for example, iso-butane or iso-pentane.

Such feed stocks normally contain appreciable quantities of paraffins such as normal butane.

The method shown contemplates the use of a feed stock which has already been denuded of hydrocarbons having less than 4 carbon atoms. Such preliminary treatment is conventional in the art of alkylating C₄ hydrocarbons. The olefin hydrocarbons and iso-paraffinic hydrocarbons are charged from any convenient source through pipe 25 and are passed through the heat exchanger 26 where they are brought in heat exchange relationship with cooler hydrocarbons introduced to the heat exchanger through line 27 and discharged therefrom through line 28.

After being cooled in the heat exchanger, the feed stock passes through pipe 29 and is introduced into the mixer 15 where it is intimately combined with the recycled catalyst charged to the mixer through pipe 30. The mixture of olefin absorbed in the catalyst passes from the mixer 15 through pipe 31 into the separator 16. The separator is so designed that it is operated full of liquid and the time of separation is reduced to a minimum. In place of the mixing and separating apparatus shown, this equipment may be replaced either by conventional centrifuges for effecting rapid separation of the two liquids or by a modified type of combined absorber-mixer and separator shown in Fig. 4. When this modified absorber-mixer is used, instead of absorbing the olefin hydrocarbons in the liquid phase, they are vaporized with the feed stock and absorbed into the catalyst from the vapor mixture. The unabsorbed hydrocarbons pass from the absorber as vapor and must be reduced to liquid form in conventional apparatus, not shown.

Referring to Fig. 4, the absorber-mixer consists of a shell 32, which has a tapered bottom and is flanged at 33 to receive the flange 34 of a motor and pump assembly 35. The motor shaft is extended into the body of the shell 32, as shown at 36 and, on the upper end of the shaft is mounted a rotating shrouded disk 37. Surrounding the shaft is an open-ended tube 38 in the lower part of which are apertures or inlet openings 39. Into the top of the shell is a pipe connection 40, which terminates just above the shrouded disk 37. In the upper part of the shell is a baffle plate 41 having a center aperture 42 which directs the vapors rising through the shell toward the center and through an annular opening around the pipe 40. In the upper part of the motor pump assembly is a centrifugal pump rotor 43, mounted upon the shaft 36 and rotating with the shaft at the same speed as the shrouded disk.

As previously suggested, this absorber-mixer takes the place in the system of the mixer 15 and the separator 16. The hydrocarbon feed charged through line 29 is introduced into the shell of the absorber-mixer in vapor form through nozzle 44, the end of which extends centrally into the shell of the mixer. The chilled acid from chiller 14 passing through line 30, is introduced through pipe 40 into the top of the mixer and is distributed by the rotating disk 37 in a thin film horizontally from the periphery or outer edge of the disk. The hydrocarbon vapor introduced through pipe 44 rises through the shell and, in passing through this thin film or atomized screen of acid, has the olefin portion thereof absorbed in the acid. The remainder of the hydrocarbon or unabsorbed vapor passes upward through the aperture 42 and is discharged from the shell of the mixer through pipe 45. On discharge from the mixer, the hydrocarbon vapors are reduced to liquid form in conventional compression condensing apparatus, well known in the art, and thereafter is passed into the fractionator 23 to be treated in the same manner as the liquid hydrocarbons discharged through line 28.

The acid catalyst projected from the disk which absorbs the olefinic hydrocarbons, gravitates to the bottom of the mixer and is picked up by pump 43, and discharged through pipe connection 46 to contactor 1.

Returning now to the operation where the mixer and separator are used, as shown in Fig. 1, the acid and olefin mixture being of higher specific gravity than the hydrocarbons, settles to the bottom of the separator 16 and is drawn off through pipe 47 and is charged by pump 5 through line 46 to contactor 1. The unabsorbed hydrocarbons, including iso-butane and normal butane, pass off from the top of the separator through line 48 to settler 4. In this settler, acidity in the hydrocarbons is removed by a soda mixture circulated through the settler by means of pump 10 and connecting pipes 49 and 50. Through pipe 51 fresh soda may be supplied and spent soda removed through pipe 52. Suitable valves are supplied in these pipes to control the introduction or withdrawal of the soda from the cycle. The hydrocarbons, after soda treatment, are removed from the top of the settler through pipe 27, brought in heat exchange relation with the feed stock, and then discharged through pipe 28 to the fractionator 23.

The temperature of the fractionator is maintained by a heating coil 53 in the bottom of the tower and a reflux system at the top includes a pump 13, a condenser 54, a receiver 55, an overhead pipe from the tower 56 and a return pipe 57, the system being conventional in the art. From the bottom of the fractionator through pipe 58 are removed liquids heavier than C₄ fractions. From the refluxing system in liquid form are removed iso-butane and normal butane fractions through the pipe 59. These hydrocarbons are directed to the de-isobutanizer 24. The temperature in the de-isobutanizer is controlled in a similar manner by a heating coil 60 and a top tower refluxing system including a drawoff pipe 61, a condenser 62, a receiver 63, pump 64, and return line 65. From this refluxing system is removed iso-butane through line 66, which iso-butane is accumulated in the feed tank 67. From the bottom of the de-isobutanizer we remove normal butane through pipe 68, which is discarded from the system.

In the event the product withdrawn from the fractionator through line 58 shows appreciable quantities of olefins or unalkylated hydrocarbons, a line 69 connected between the feed tank 67 and pipe 58 furnishes a means for diverting such materials to the feed tank. If this material contains considerable alkylated hydrocarbons they are passed directly to the alkylate rerun tower 22 through pipe 70, pump 9, and line 71.

Returning to the materials charged to the alkylate reaction stage, the catalyst containing the absorbed olefin is supplied through pipe 46. The iso-paraffins accumulated in the tank 67 are charged through pipe 72, pump 8 and pipe 73, and are introduced to the contactor 1 where they are brought in rapid and intimate contact with the catalyst-olefin mixture. Rapidity of circulation of the contents of the contactor is an important adjunct to a proper reaction.

Alkylation proceeds with the generation of exothermic heat which is dissipated by a refrigerating medium, circulated through a heat exchanger, the top of which is designated by the numeral 74 and which extends down into the mixing portion of the contactor. The contactor is so constructed that, during alkylation, the reactants are rapidly circulated through the heat exchanger.

A closed ammonia system is used for removing this exothermic heat and chilling the catalyst prior to the absorption of the olefin. Ammonia is supplied through pipe 75 to the receiver 19. Gaseous ammonia is compressed in compressor 17 and is discharged through pipe 76 through condenser 18, thence to the receiver 19 through pipe 77. The cool liquid product from the receiver is distributed through pipes 78 and 79 to the catalyst-chiller 14. A return line 80 from the chiller directs the ammonia vapors for recompression, to the suction side of the compressor 17. The ammonia refrigerant is also supplied from the receiver 19 through pipes 78 and 81 to separator 20, from which the liquid product is supplied through line 82 to heat exchanger 74. Ammonia vapor and entrained liquid is returned from the exchanger 74 through pipe 83, back to the separator 20. The separated vapor is taken off from the top of the separator and is returned through pipe 84 to the compressor.

Desired temperatures in the catalyst-chiller 10 and temperatures of reaction in the alkylation stage are controlled by manipulation of the valves in lines 80 and 84, which regulate the pressure of the ammonia refrigerant.

The hydrocarbon catalyst mixture discharged from the contactor 1 passes through pipe 85 to separator 2 where the catalyst is separated from the alkylated hydrocarbon. The catalyst accumulated in the bottom of the settler, with or without dilution or addition of stronger acid, is returned through pipe 86, pump 6 and line 87 to the acid chiller 14 and olefin-absorption system, previously described. Acid of alkylating strength that is from 85% to 96% H$_2$SO is therefore used in the olefin absorption system. It is contemplated also to recycle a controlled amount of the alkylate withdrawn through pipe 85 directly to the absorption system by means of bypass line 85a which directs the catalyst hydrocarbon mix around the settler 2.

To augment the acid catalyst from time to time if operating continuously, or to recharge the acid cycle in the event batch operation is used, acid is supplied through pipe 88 and spent acid withdrawn through pipe 89. Both of these lines are controlled by suitable valves.

The hydrocarbons separated in the settler are removed therefrom through pipe 90 and are contacted with soda for neutralization in soda settler 3. Soda is circulated through this settler by means of a pump 7, pipes 91, 92 and 93. Fresh soda is supplied to the cycle through pipe 94 and spent soda is removed through pipe 95, controlled by suitable valves.

The treated hydrocarbons discharged from soda settler 3 pass through pipe 96 to the alkylate stabilizer 21. From the top of the stabilizer are taken off iso-paraffins containing a small amount of butane, through line 97, which pass through a refluxing system consisting of a condenser 98, receiver 99, pump 12, and a return line 100. From this refluxing system are removed liquid-iso-paraffins through pipe 101, to be directed either to the feed tank 67 through pipe 102 or to the de-isobutanizer through pump 103 and pipe 112. Normally, the hydrocarbons bled from the refluxing system connected into the top of the alkylate stabilizer, are passed to the feed tank 67. Should any normal butane be accumulated in the system, a portion of the stream withdrawn through pipe 101 is diverted to the de-isobutanizer to exhaust this butane.

In the bottom of the alkylate stabilizer is a heating coil 104 for maintaining proper temperatures in the tower.

From the bottom of the alkylate stabilizer is removed the total alkylate through pipe 105, which is forced by pump 9 through pipe 71 to the alkylate rerun tower 22.

Overhead materials are removed from the top of the rerun tower 22 through pipe 106 and the alkylate bottom taken off from the lower portion of the tower through pipe 107. This tower is equipped with a refluxing system similar to those previously explained. It consists of the withdrawal line 106 connected into the top of the tower, condenser 108, receiver 109, pump 11 and return pipe 110. The ultimate product from the system, defined as "alkylate" heretofore and which constitutes an end point alkylate, is withdrawn from the reflux system of the alkylate rerun tower 22 through pipe 111.

Test runs utilizing the process explained were made under different operating conditions to determine the effect of operating variables. It was readily noted that, in order to obtain good results, it was necessary to use large quantities of acid to that portion of the system in which the olefin was absorbed by the catalyst-acid in the order of 100 volumes of acid or more to 1 volume of olefin. Under these conditions, it was possible to produce a total alkylate showing a rerun yield of 96 per cent of 280° F. end point having an octane number of 94.8 C. F. R. A. S. T. M. As the acid-olefin ratios were lowered, the quality of the product depreciated both in rerun yield and octane number. Due to limitations of apparatus, the residence time of the olefin in the acid necessarily became longer as the quantity of acid was decreased. At an acid-olefin ratio of 15 or 20 to 1 the product was very poor. After apparatus changes were made which enabled the use of shorter time factor, improved results were obtained even at these lower acid-olefin ratios.

When attempting to correlate the accumulated data from a large number of test runs, it was discovered that a factor could be developed from the acid-olefin ratio and the residence time of the olefin in the acid which made possible the plotting of both the octane number and the rerun yield against this factor to make a smooth curve in each case.

This factor is obtained by taking the volume ratio of acid to olefin fed to the absorber and dividing the ratio thus obtained by the total time in minutes that the olefin is in contact with the acid from the initial meeting of the two constituents in the absorber or mixer until the olefin-bearing acid enters the alkylation reaction zone or contactor.

In other words, the higher the acid-olefin ratio and/or the shorter the residence time of the absorbed olefin in the acid, the better is the alkylate produced in the matter of both rerun yield and octane. Curves showing rerun yield and octane plotted against the acid-olefin ratio, divided by the time factor, form a part of the specification.

Tests plotted on the curve were conducted at operating temperatures of 40° to 50° F. and 22° F. maintained in the absorber and separator.

The effect of decreased temperature was to improve the results by raising the entire curve for both octane number and rerun yield. These low temperatures could be obtained only by obtaining relatively low temperatures of the refrigerant in the refrigeration cycle. For this reason, a closed ammonia system was adopted in place of utilizing the iso-butane recovered from the alkylate separator as a refrigerant. The invention contemplates, however, that constituents of the alkylation reaction may be used as a refrigerant in the cooling cycle, as well as ammonia.

All of the runs considered in these tests were conducted at high iso-butane olefin ratios in the alkylation contactor so that any possible detrimental effect of low ratios in the alkylation zone were eliminated. In other words, the conditions in the alkylation contactor were optimum and could be considered as constant for all runs Assuming, therefore, that conditions of the alkylation reaction are properly established for good results, then this acid olefin ratio time factor in the absorption section becomes the governing factor for best results at any given operating temperature.

The magnitude of improvement to be expected from an increase in the acid olefin ratio time factor will be different for each operating temperature on the absorber separator system as shown in Figs. 2 and 3. A different curve can be developed for each temperature range but the acid olefin ratio time factor remains the controlling variable in each case.

Figs. 2 and 3 show that, unless the ratio time factor is greater than 10, a decidedly inferior alkylate will be produced. The ratio time factor should be maintained greater than 10 and preferably greater than 50. Excellent results are obtained even with low acid olefin ratios provided the residence time of olefin in the acid is sufficiently short to bring the ratio time factor up to the desired figure.

For example, assuming an acid olefin ratio of 15 to 1 and a time factor of .3 of a minute for the residence time of the olefin in the acid, a ratio time factor of 50 is obtained. Under these conditions and with a temperature range of from 40° to 50° F. in the absorber, the curves in Figs. 2 and 3 show the rerun yield 83 per cent, the octane number 90.6. Assuming the same acid olefin ratio time factor and temperature of 22° F. in the absorber, these curves show a rerun yield of alkylate of 95 per cent and an octane number 94.7. Results at 22° F. show an excellent product and an improvement over those at the higher temperatures.

Contrasting these results by increasing the time factor, assuming that the acid olefin ratio remains 15 to 1 and the time is increased from .3 of a minute to 2 minutes; the ratio time factor now becomes 7½. The rerun yield, utilizing this ratio time factor at a temperature range of from 40° to 50° F. would be 65 per cent, the octane number 88. Using the same ratio time factor under temperature conditions of 22° F. in the absorber, the rerun yield would be 90 per cent and the octane number 92.5, which is a relatively inferior product.

Having thus described my invention, I claim:

1. A method of alkylation in which iso-paraffinic hydrocarbons are alkylated with olefinic hydrocarbons in the presence of a condensation catalyst in an alkylation stage and the catalyst recycled for reuse, the improvement which comprises selectively absorbing the olefinic hydrocarbons of the charge in the catalyst prior to alkylation and limiting the residence time period of contact of the catalyst and olefins in minutes to less than one tenth of the volumetric catalyst olefin hydrocarbon ratio.

2. A method of alkylation in which iso-paraffinic hydrocarbons are alkylated with olefinic hydrocarbons in the presence of a condensation catalyst in an alkylation stage and the catalyst recycled for reuse, the improvement which comprises selectively absorbing the olefinic hydrocarbons of the charge in the catalyst prior to alkylation and limiting the residence time period of contact of the catalyst and olefins in minutes to less than one tenth of the volumetric catalyst olefin hydrocarbon ratio, bringing a refrigerating medium in indirect contact with the reactants in the alkylation stage and the recycled catalyst to maintain the respective materials at predetermined temperatures.

3. A method of alkylation in which iso-paraffinic hydrocarbons are alkylated with olefinic hydrocarbons in the presence of a condensation catalyst in an alkylation stage and the catalyst recycled for reuse, the improvement which comprises selectively absorbing the olefinic hydrocarbons of the charge in the catalyst prior to alkylation and limiting the residence time period of contact of the catalyst and olefins in minutes to less than one tenth of the volumetric catalyst olefin hydrocarbon ratio, and maintaining the temperature of the mixture during the residence time of the olefins in the catalyst below 50° F.

4. A method of alkylation in which iso-paraffinic hydrocarbons are alkylated with olefinic hydrocarbons in the presence of a condensation catalyst in an alkylation stage and the catalyst recycled for reuse, the improvement which comprises selectively absorbing the olefinic hydrocarbons of the charge in the catalyst prior to alkylation and limiting the residence time period of contact of the catalyst and olefins in minutes to less than one tenth of the volumetric catalyst olefin hydrocarbon ratio, separating paraffinic and iso-paraffinic hydrocarbons from the mixture of catalyst and charge prior to the introduction of the catalyst olefin mixture to the alkylation stage.

5. A method of alkylation in which iso-paraffinic hydrocarbons are alkylated with olefinic hydrocarbons in the presence of a condensation catalyst in an alkylation stage and the catalyst recycled for reuse, the improvement which comprises selectively absorbing the olefinic hydrocarbons of the charge in the catalyst prior to alkylation, limiting the residence time period of contact of the catalyst and olefins in minutes to less than one tenth of the volumetric catalyst olefin hydrocarbon ratio, separating paraffinic and iso-paraffinic hydrocarbons from the mixture of catalyst and charge prior to the introduction of the catalyst olefin mixture to the alkylation stage, and charging the iso-paraffinic hydrocarbons to the alkylation stage.

DAVID H. PUTNEY.